June 20, 1950     E. P. McNAIR     2,511,933
HAND CORN CUTTER
Filed July 29, 1946

INVENTOR.
Eric P. McNair
BY Benedict & Swartwood
ATTORNEYS

Patented June 20, 1950

2,511,933

UNITED STATES PATENT OFFICE 2,511,933

HAND CORN CUTTER

Eric P. McNair, Mattoon, Ill.

Application July 29, 1946, Serial No. 686,905

1 Claim. (Cl. 146—4)

This invention relates to a hand corn-cutter for use by housewives and the home-canner for removing kernels of corn from a cob either in an uncooked or cooked condition.

In preparation of corn for canning, freezing or for table use, it is frequently desired to remove the kernels from the cob. A number of tools of this sort on the market have the disadvantage that this cannot be done by one stroke of the tool.

It is an object of this invention to provide a tool which will remove substantially all the kernels from the cob in one stroke of the tool.

It is a further object of this invention to provide a simple tool for the above set forth purpose which is easy to use and economical to make.

A further object of this invention is to provide a tool which is adjustable for various sized ears of corn.

Figure 1:
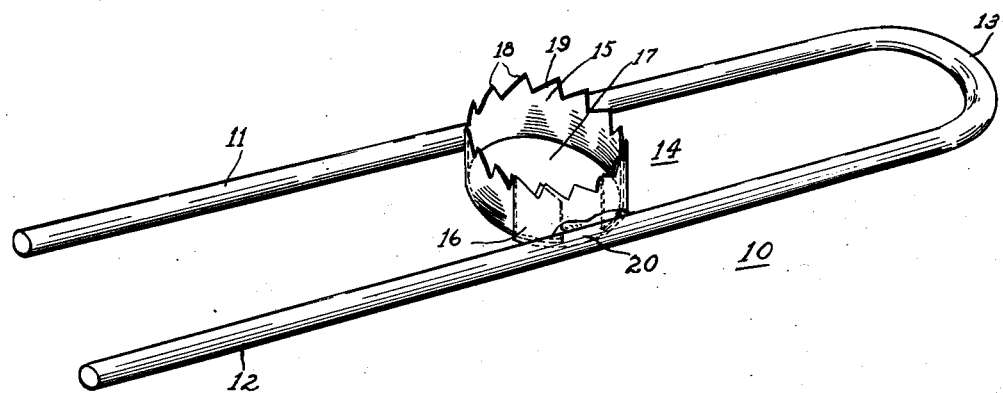
Figure 2:
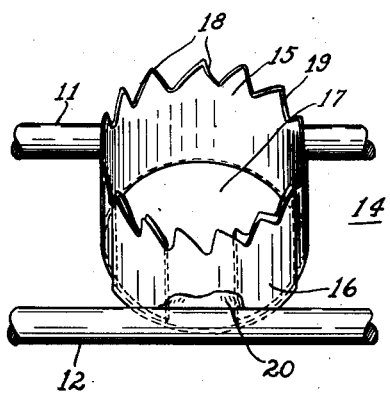

Other advantages, objects and uses of my invention will become apparent by referring to the drawings in which the Figure 1 is a perspective view of the tool and Figure 2 is a large perspective view of the cutting portion of the tool.

Referring to the drawings, the U-shaped handle portion is generally designated by the numeral 10. The handle portion 10 comprises two substantial parallel sections 11 and 12, which are joined together in a form of a continuous U at 13. The handle portion should be made of material of sufficient springing qualities and size to permit bending. The handle 10 as shown is made of a rod preferably of steel although a flat handle could be used.

The entire device may be made of cold rolled steel although stainless steel is preferable since it requires no protective coating to protect the instrument from the acids in the corn which tend to corrode ordinary steel.

The cutting portion of the tool is generally designated as 14 and it comprises two annular overlapping sections 15 and 16. The annular overlapping sections are preferably made of steel having some springing qualities and is generally made of tempered steel which is capable of bending into the desired shape and which will also hold a cutting edge. It may be made of steel varying from 16 to 24 gauge.

It should be noted that the two annular sections 15 and 16 are not of the same size. Section 15 is substantially larger than a half circle and section 16 is substantially smaller than a half circle although the two are of such a size that they substantially overlap as shown so that one complete circle is formed by the two sections 15 and 16. It has been found that it is preferable to have the two sections of different sizes in order that when the device is adjusted for different sized ears of corn, that the cutting circle remains true during the cutting operation. If the two sections 15 and 16 were of about the same size, there would not be sufficient resiliency in the cutting portion 14 and it would not remain a true circle during the cutting operations. This is particularly true when cutting ears of corn which are smaller than the annular opening 17 formed by the cutting portion 14.

The annular cutting portion 14 is provided with a series of teeth 18 which are sharpened along the edges as indicated by the numeral 19. It is preferable to have the teeth 18 sharpened on the inside as shown on the drawing rather than on the outside. The reasons for this are that when the teeth are sharpened on the inside, the cutting portion 14 tends to pull away from the cob rather than dig in towards the cob and it can be maintained in cutting position by pressure on the two sides of the handle 11 and 12. A much cleaner cut is obtained when the teeth are sharpened on the inside as shown rather than on the outside.

The cutting portion 14 may be fastened to the handle 10 by suitable welding at the point 20 although other means of attachment may be used. It is also preferable that the welding be done by what is commonly known as "spot welding."

The tool is used as follows: An ear of corn is placed on a table perpendicular to the table and the instrument is placed over the ear of corn and by properly grasping the handle on each side of the cutting portion 14, the kernels may be removed by one downward slicing motion. If the ear of corn is smaller than the annular opening, the operator merely squeezes more on the handle portions 11 and 12. If the ear of corn is larger, the device will expand and properly cut the larger ear.

Therefore within reasonable limits, depending upon the amount of overlapping of sections 15 and 16, I have provided an instrument which will cut the kernels from any sized ear of corn.

I claim as my invention:

A tool for cutting corn kernels from the cob comprising a U-shaped handle member having generally parallel legs capable of being resiliently forced toward each other, and an annular cutter of adjustable diameter secured between said legs, said cutter comprising a first sheet metal section forming an arc of substantially less than 180° of a circle and having its convex surface secured to one of said legs and a second sheet metal section forming an arc of substantially more than 180° of a circle, said second section having its convex surface secured to the other of said legs, the ends of said second section lying within and overlapping the ends of said first sheet metal section, and serrated cutting edges on said sections, said cutting edges being sharpened on the inner, concave surfaces of said sections.

ERIC P. McNAIR.

REFERENCES CITED

The following references are of record in the file of this patent:

UNITED STATES PATENTS

| Number | Name | Date |
|---|---|---|
| 53,849 | McGill | Apr. 10, 1866 |
| 961,825 | Wells | June 21, 1910 |
| 1,224,474 | Lake | May 1, 1917 |
| 2,297,565 | Kors | Sept. 29, 1942 |

FOREIGN PATENTS

| Number | Country | Date |
|---|---|---|
| 348,900 | Germany | July 5, 1919 |